INVENTORS:
JAMES E. CRANE and
EDGAR J. RICHARDS

ATTORNEY.

INVENTORS.
JAMES E. CRANE and
EDGAR J. RICHARDS

Sept. 24, 1963  J. E. CRANE ET AL  3,104,425
MOLDING APPARATUS FOR FORMING AN UNDERCUT
Filed March 2, 1961  3 Sheets-Sheet 3
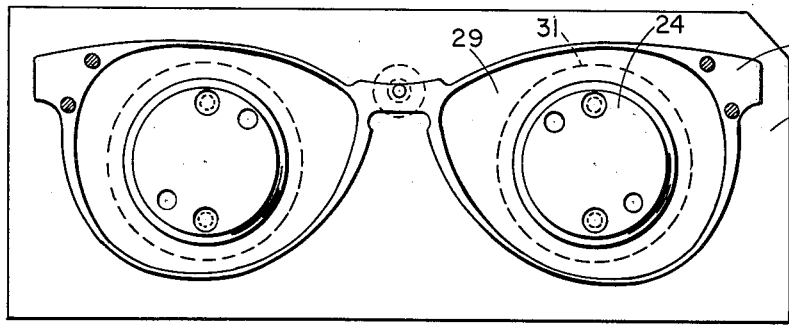
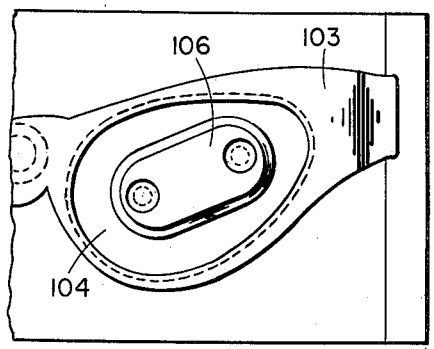
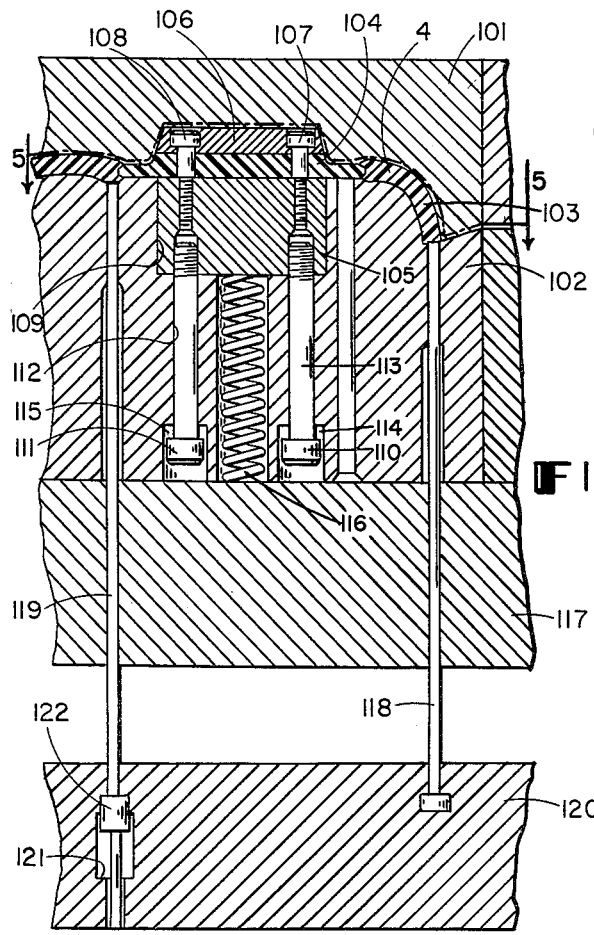
INVENTORS.
JAMES E. CRANE and
EDGAR J. RICHARDS
BY
Stanley Sacks
ATTORNEY.

United States Patent Office 3,104,425
Patented Sept. 24, 1963

3,104,425
MOLDING APPARATUS FOR FORMING AN UNDERCUT
James E. Crane, Leominster, and Edgar J. Richards, Fitchburg, Mass., assignors to Foster Grant Co., Inc., Leominster, Mass., a corporation of Delaware
Filed Mar. 2, 1961, Ser. No. 92,806
2 Claims. (Cl. 18—42)

This invention relates generally to the art of manufacturing molded articles and the apparatus therein employed. More specifically, this invention relates to an apparatus for making a continuous or discontinuous groove or indentation in a molded thermoplastic object during the molding thereof.

While my apparatus may be adapted for use on many articles, I have found it to be most advantageous when employed in molding generally polygonal lens grooves in sun or prescription eyeglass frames.

The formation of lens grooves in eyeglass frames has long been a problem in the art. Many methods have been devised for forming such grooves. Major difficulty arises in attempting to mold the eyeglass frame with the groove in each eye wire, i.e., the plastic, lens holding portion of the frame. In such a molding procedure, the groove formation results in an "undercut" rim, i.e., the die lip that forms the groove, occupies the groove in the molded frame and when the mold is opened, the die tends to prevent the eyeglass frame from being ejected from the mold. Workers in the art have experimented with various means of providing collapsible core dies that expand to form the groove in the frame when the mold is closed and will contract or collapse to clear the undercut rim when the mold is opened, allowing ejection of the frame from the die. These methods, although successful in some instances, are extremely expensive. Moreover, the mechanical arrangements for moving the collapsible means are in many cases unreliable as a result of frequent jamming or malfunction thereof. Many workers in the field have avoided the problem in its entirety by resorting to a method of heat sealing lenses in sun or corrective eyeglass frames. In the heat sealing procedure, a lens is inserted in an eyewire portion of the frame and placed against a molded stop or rim. The edge of the eyewire frame is then heated and rolled over to seal the lens in position. This procedure is costly and time consuming.

Other workers in the field have obtained a desirable grooved eyeglass frame by performing a two step operation. The frame is first molded and then in a second step, a lens groove is cut by hand or machine in the molded frame. This method is unduly costly and time consuming.

We have now found that an undercut groove or indentation can be formed in a molded plastic item during the molding procedure employing efficient, inexpensive apparatus. Most unexpectedly, we have found that it is not necessary to provide complicated mechanical means to withdraw the portion of the die that forms the undercut groove. Instead, we employ a resilient material for that portion of the die that extends into the undercut portion of the molded article. Surprisingly, we have found that the resilient material employed will retain its shape during the molding procedure and can be readily deformed to allow ejection of the undercut plastic article from the mold cavity block. Our device performs the function of forming an undercut groove or indentation efficiently, rapidly and economically.

More specifically, we have found that a generally polygonal groove either continuous or discontinuous can be formed in the eyewire portion of the frontal piece by inserting a generally polygonal resilient disc in the mold cavity. Normally, the disc is attached to the ejection cavity block although, if desired, it may alternatively be attached to the injection cavity block. Substantially conventional molding apparatus may be employed in combination with the apparatus of our invention to form grooved eyewire members.

Our invention will be easily understood from the following description and drawings embodying the invention which are merely illustrative of the invention but are not to be taken as limiting. In the drawings like numerals indicate like parts.

FIGURE 3 is a top view taken along line 3—3 of FIGURE 1.

FIGURE 4 is a fragmentary side section of an alternate molding apparatus embodying our invention.

FIGURE 5 is a top plan view of the embodiment of FIGURE 4 taken along line 5—5.

The drawings illustrate two embodiments of modified conventional molding apparatus employing the improvements of our invention. In the apparatus a resilient disc is mounted so that a portion thereof protrudes into the mold cavity formed by the mold cavity block. The apparatus is designed so that the molded article formed in the mold cavity can be removed from the apparatus by positive forces so applied that the resilient disc is resiliently deformed during removal.

Figure 1:
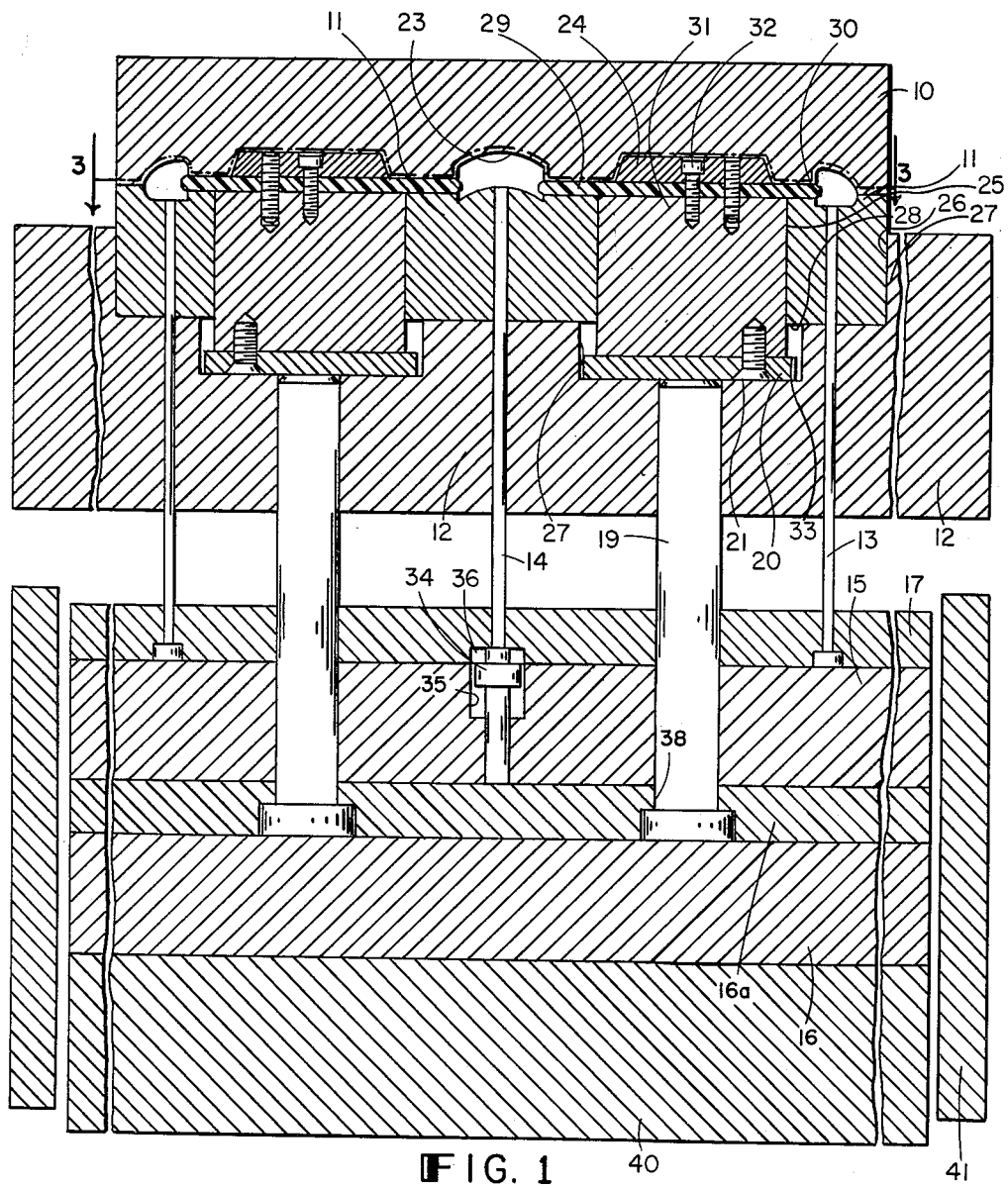
FIGURE 1 is a side section of a conventional molding apparatus embodying the improvements of our invention.
Figure 2:
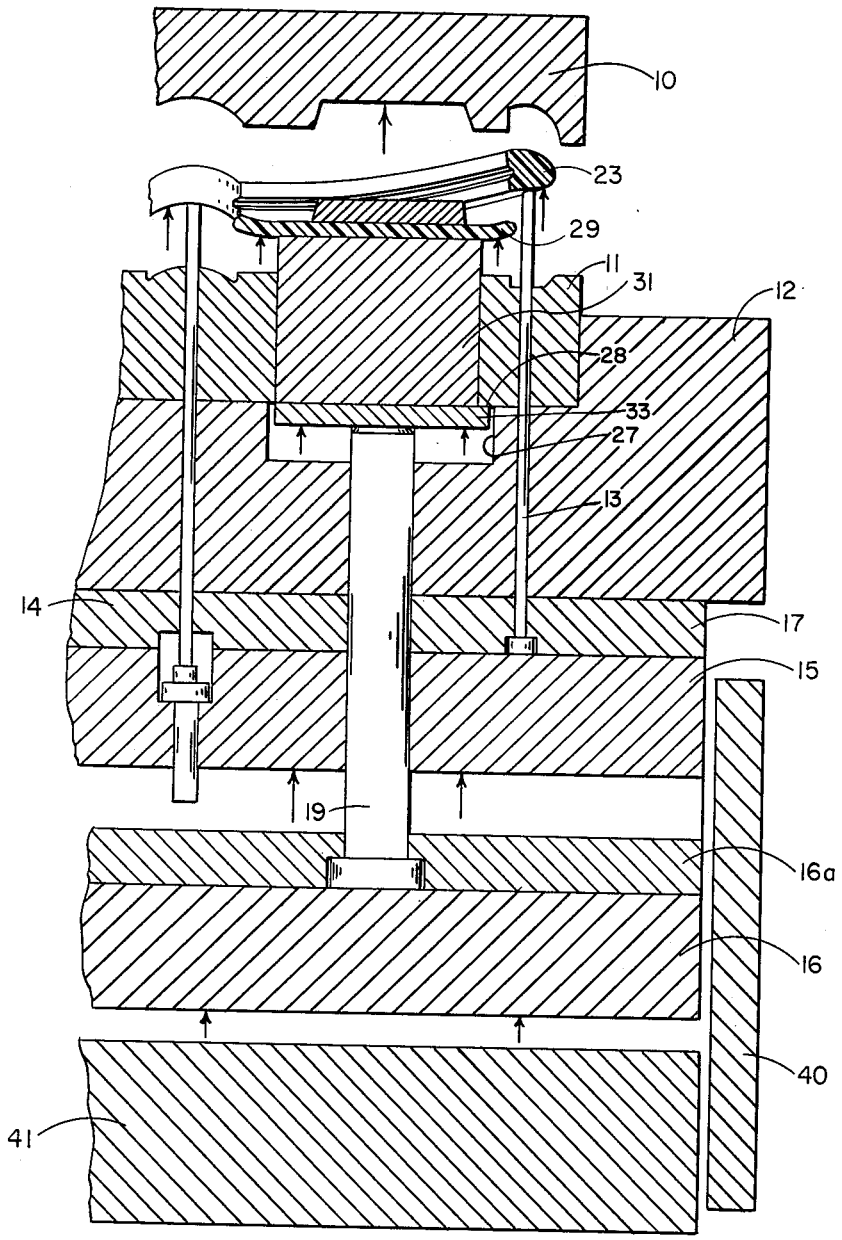
FIGURE 2 is a fragmentary side section of the conventional molding apparatus, as shown in FIGURE 1, showing the mold cavity blocks in their opened position.

One embodiment of the modified apparatus of this invention is shown in FIGURES 1 to 3. As most clearly shown in FIGURES 1 and 2 the molding apparatus of our invention comprises an ejection mold cavity block 10 and an ejection cavity block 11. Ejection cavity block 11 is provided with a central bore 25 adapted to receive the lens plate assembly of our invention. As can be readily seen the mold cavity shown is adapted to form a conventional sun or corrective eyeglass frontal piece 23. Ejection cavity block 11 is mounted on a plate or mounted block 12 which has a central indentation stepped or cut back as shown at 26 and 27. Portion 28 of ejection cavity block 11 lies within the stepped opening in mounting block 12.

The lens plate assembly of this embodiment comprises several parts, the most significant of which is the resilient lens plate member 29. Lens plate member 29 is composed of a resilient material preferably of a plastic such as tetrafluoroethylene, nylon, polycarbonate resins, etc. It is also within the scope of this invention to provide a highly resilient metallic lens plate member 29. It is only necessary that lens plate member 29 have the required resiliency and be sufficiently resistant to distortion or destruction at the temperatures and pressures employed in conventional injection molding techniques.

The outer edge or generally polygonal rim 30 of lens plate member 29 protrudes into the mold cavity and actually forms a part of the mold cavity as clearly shown in the closed mold illustrated in FIGURE 1. Rim 30 may be so shaped as to provide a generally semi-circular cross-sectioned lens groove or, alternatively, a lens groove cross section of any desired shape. A flat washer 24 is positioned over lens plate 29. Bolts as shown at 32 affix washer 24 and lens plate 29 to a mandrel or cylindrical shaped base 31. The mandrel 31 is slidably mounted within central bore 25 and mold cavity block 11. A stopper plate 20 is mounted by means of bolts such as shown at 21 to the bottom or lower portion of mandrel 31. The stopper plate 20 has a protruding generally polygonal or circular rim 33.

The ejection mechanism of our apparatus comprises means performing three different mechanical movements of the molded frame 23 in the apparatus of our invention. A composite substantially flat pusher plate composed of plates 16 and 16a is provided integrally attached to mandrel or cylindrical member 19 at the lower end thereof. As shown, the first ejection or pusher plate comprises two sections, 16 and 16a, in order to provide a relatively simple attachment between the mandrel 19 and the pusher plate, by means of a stepped hollow bore 38 in plate 16a. It is also possible to use a single pusher plate having mandrel 19 firmly welded or attached thereto. An ejection plate 15 having a bore 35 therein is positioned directly on top of the pusher plate when the mold is in the closed position. Conventional pin plate 17 having pin 13 attached at one side thereof and pin 14 passing through it at its center portion is provided. As can be seen in FIGURES 1 and 2, pin 14 has an enlargement or rim 34 at its lower portion. This enlargement 34 along with pin 14 is slidable in bored portions 35 and 36. It can be seen that plate 17 provides a stop for enlarged portion 34 at its uppermost portion while plate 15 provides a stop for pin 14 and enlargement 34 at its lower most portion. This arrangement provides a delayed action for pin 14 allowing pin 13 to effectuate partial removal of the rim 23 previous to pin 14 affecting any ejection of rim 23 as will be more fully described in the following paragraphs.

The operation of our apparatus will be easily understood from the following description with relation to the drawings. When the mold is closed the parts of the apparatus are arranged as shown in FIGURE 1. Pusher plate 16, 16a is in its lower most position with ejection plate 15 resting thereon and pin plate 17 in contact with ejection plate 15 and resting thereon. Pins 13 and 14 are in their lower most position. Molten thermoplastic material is injected into the mold cavity through conventional gates, not shown, and is formed into frame 23 having a lens groove. When the thermoplastic material has hardened, the mold is opened by raising cavity block 10 as shown in FIGURE 2. Simultaneously pusher plate 16, 16a is raised along with ejector plate 15 and pin plate 17. These plates are raised simultaneously until the point is reached where stopper plate 20, which is preferably a circular disc having a diameter slightly larger than the diameter of mandrel 31 and held to said mandrel by conventional means such as screw 21, traverses the length of wall 27 and is stopped by wall 28. At this point, the upward movement of pusher plate 16, 16a is stopped. The preceding action moves the frame 23 and the lens plate 29 simultaneously into a position slightly above the mold cavity half of die block 11. The frontal piece is now completely removed from the die cavity block, however, it is still firmly attached to the lens plate member 29. The travel of ejection plate 15 is continued in an upward direction. This movement will cause ejection pin 13 to strip the outer most portion of the frontal member from the lens plate as clearly shown in FIGURE 2 while pin 14 remains substantially stationary as stop 34 is not pushed by ejection plate 15 until ejection pin 13 has performed its function. After stripping of the outermost portion of the frontal member from the lens plate, stop 34 of pin 14 is actuated by ejection plate 15 and pushes the central portion of the frontal piece from the lens plate thus accomplishing completed stripping and final ejection of the frontal piece member from the apparatus. Thus, it can be seen that the stop 34 acts as a delayed action mechanism preventing final stripping from the lens plate until preliminary stripping of the frontal piece member 23 has been accomplished. The actuating means for ejection plate 15 and pusher plate 16 (not illustrated), 16a may be separate drive mechanisms or a single drive mechanism having cam linkage to the pusher plate and ejection plate thus allowing for the simultaneous first movement of both plates and the later stopping of the pusher plate and continued movement of the ejection plate.

An alternate mechanism for mounting and actuating the resilient disc of our invention is shown in FIGURES 4 and 5. In this embodiment an injection cavity block 101 and ejection cavity block 102 are provided. These blocks are adapted to form a mold cavity for an eyeglass frame 103 of the wrap around type. Obviously, any style frame may be formed if desired.

Resilient disc 104 protrudes into the molding cavity 4 and is mounted on mandrel 105 by means of cover plate 106 and retaining bolts 107 and 108. The resilient disc 104 has an integral raised portion at the top surface thereof adjacent cover plate or washer 106 which tends to prevent cutting of the cover plate into the disc when the disc is deformed. The mandrel 105 is slidable in a recess 109 in ejection cavity block 102. Stabilizing screws 110 and 111 are firmly anchored in mandrel 105 as by thread means, welds, force fit joints, etc. These stabilizing screws are slidable in bores 112 and 113 and have stops 114 and 115 at the lower most portion thereof. A spring 116 which is preferably a coil spring extends between back-up plate 117 and mandrel 105. Ejector pins 118 and 119 are provided mounted on ejector plate 120. As can be seen at FIGURE 4 pin 119 has an enlarged stop or rim 122 slidable in recess 121 thus providing a delayed action mechanism for the pin.

When the mold cavity is opened, spring 116 pushes mandrel and attached resilient disc 104 upward so that disc 104 is slightly above the mold cavity block.

The molding cycle is started by the downward movement of die cavity block 101 which engages with die cavity block 102 and pushes resilient disc 104 into position in the molding cavity formed by the blocks. Simultaneously the substantially flat ejection plate 120 is placed in its lower most position thus locating ejection pins 118 and 119 in the position shown in FIGURE 4. At this point molten thermoplastic material is injected into the mold cavity via a conventional fill gate (not shown) and solidified therein. Cavity block 101 is raised allowing spring loaded mandrel 105 to push resilient disc 104 upward thus carrying the molded frame 103 therewith. A second movement of the molded frame is accomplished when ejection plate 120 is raised causing the outer portion of the frame 103 to be stripped from the outer edge of the disc by the action of pin 118. The third and final stripping is accomplished by delayed action pin 119 which is actuated by the upward movement of ejection plate 120 when delayed action enlargement 122 is pushed by the bottom of cylindrical bore 121. The frame is thus freed from the mold and the cycle is completed.

It should be understood that the basic feature of our invention is the use of a highly resilient lens plate of the type described. The particular mechanism for utilizing this lens plate may be varied as desired. Thus, the particular arrangement of ejection pins, ejection plates and pusher plates, etc. may vary. Terms such as upward, downward, etc. are relative and it is obvious that horizontal, vertical, etc. opening dies may be employed. Further, the shape of the mold cavity itself may vary to allow a groove or indentation to be formed on the outside or inside of an object. If desired, several eyeglass frames may be molded simultaneously by providing several mold cavities of the type described herein in a single machine.

My invention as disclosed herein may be used in conjunction with conventional molding apparatus. Sections such as base member 40 and actuating member 41 may be considered to be portions of conventional molding apparatus. Thus, the apparatus may be actuated by an actuating member 41 shown diagrammatically or by hydraulics or other means in connection with conventional molding machines. Similarly, the entire power and drive source and plastic injection apparatus are of a conventional nature.

Many alterations and changes may be made without departing from the spirit and scope of this invention which is set forth in the following claims which are to be construed as broadly as possible in view of the prior art.

We claim:

1. Molding apparatus for forming an undercut portion in a molded article comprising an injection mold cavity block and an ejection cavity block, said blocks having mating mold cavity portions adapted to form a mold cavity, a highly resilient member having a rim portion partially projecting into said mold cavity, securing means positioned over and in contact with said highly resilient member intermediate of its rim portion and external of said mold cavity for securing said highly resilient member to a base member slideably mounted in a bored portion of said ejection mold cavity block, means integral with said injection mold cavity block for maintaining said rim portion of said highly resilient member in non-deformed condition when said cavity blocks are in closed, molding position, means for removing a molded article having an undercut portion formed in said mold cavity from said mold cavity together with said highly resilient member in contact with said undercut portion, means for partially stripping said molded article from said highly resilient member while resiliently deforming said molded article and said highly resilient member, and means for completing stripping of said molded article from said highly resilient member.

2. Molding apparatus for forming an undercut portion in a molded article comprising an injection mold cavity block and an ejection cavity block, said blocks having mating mold cavity portions adapted to form a mold cavity, a highly resilient member having a rim portion partially projecting into said mold cavity, securing means positioned over and in contact with said highly resilient member intermediate of its rim portion and external of said mold cavity for securing said highly resilient member to a base member slideably mounted in a bored portion of said ejection mold cavity block, means integral with said injection mold cavity block for maintaining said rim portion of said highly resilient member in non-deformed condition when said cavity blocks are in closed, molding position, means for separating said mold cavity blocks whereby said rim portion is rendered deformable, means for removing a molded article having an undercut portion formed in said mold cavity from mold cavity together with said highly resilient member in contact with said undercut portion, means for partially stripping said molded article from said highly resilient member while resiliently deforming said molded article and said highly resilient member, and means for completing stripping of said molded article from said highly resilient member.

References Cited in the file of this patent
UNITED STATES PATENTS

| | | |
|---|---|---|
| 2,483,093 | Harvey | Sept. 27, 1949 |
| 2,582,922 | Crowley | Jan. 15, 1952 |
| 2,614,310 | James | Oct. 21, 1952 |
| 2,714,226 | Axelrad | Aug. 2, 1955 |
| 2,929,124 | James | Mar. 22, 1960 |